United States Patent
Chiang et al.

(10) Patent No.: US 10,489,920 B2
(45) Date of Patent: Nov. 26, 2019

(54) METHOD AND ELECTRONIC DEVICE FOR DETERMINING MOVING DIRECTION OF A FINGER

(71) Applicant: Egis Technology Inc., Taipei (TW)

(72) Inventors: Yuan-Lin Chiang, Taipei (TW); I-Wen Hsi, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 114 days.

(21) Appl. No.: 15/813,059

(22) Filed: Nov. 14, 2017

(65) Prior Publication Data
US 2018/0197298 A1 Jul. 12, 2018

Related U.S. Application Data

(60) Provisional application No. 62/444,954, filed on Jan. 11, 2017.

(30) Foreign Application Priority Data

Aug. 7, 2017 (CN) .......................... 2017 1 0666448

(51) Int. Cl.
*G06T 7/223* (2017.01)
*G06K 9/00* (2006.01)

(52) U.S. Cl.
CPC .......... *G06T 7/223* (2017.01); *G06K 9/00013* (2013.01)

(58) Field of Classification Search
CPC ..... G06T 7/223; G06T 7/254; G06K 9/00013; G06K 9/00355
See application file for complete search history.

(56) References Cited

U.S. PATENT DOCUMENTS

| | | | |
|---|---|---|---|
| 6,215,898 B1 * | 4/2001 | Woodfill | G06K 9/32 |
| | | | 382/154 |
| 7,460,109 B2 | 12/2008 | Safai et al. | |
| 7,587,072 B2 | 9/2009 | Russo et al. | |
| 9,477,868 B1 | 10/2016 | Carling et al. | |
| 9,934,420 B2 * | 4/2018 | Pyun | G06K 9/00026 |
| 2005/0238211 A1 * | 10/2005 | Du | G06K 9/00026 |
| | | | 382/124 |
| 2008/0205714 A1 * | 8/2008 | Benkley | G06F 3/03547 |
| | | | 382/126 |
| 2008/0219521 A1 * | 9/2008 | Benkley | G06K 9/00026 |
| | | | 382/124 |

(Continued)

FOREIGN PATENT DOCUMENTS

| | | |
|---|---|---|
| TW | 200828135 | 7/2008 |
| TW | 201643617 A | 12/2016 |

*Primary Examiner* — Kim Y Vu
*Assistant Examiner* — Molly Delaney

(57) ABSTRACT

A method for determining the moving direction of a finger includes: sensing a fingerprint of the finger to generate a first frame at a first sampling time point, wherein the first frame includes a plurality of first blocks; sensing the fingerprint to generate a second frame at a second sampling time point, wherein the second frame includes a plurality of second blocks, wherein each of the second blocks corresponds to one of the first blocks; comparing each of the first blocks with its corresponding second block to obtain moving information of such second block; and determining the moving direction of the finger according to moving information of all of the second blocks.

16 Claims, 5 Drawing Sheets

(56) References Cited

U.S. PATENT DOCUMENTS

| | | | |
|---|---|---|---|
| 2008/0317306 A1* | 12/2008 | Hamilton | G06K 9/00026 382/128 |
| 2010/0284565 A1* | 11/2010 | Benkley | G06T 7/248 382/103 |
| 2011/0286640 A1* | 11/2011 | Kwon | G06K 9/00026 382/124 |
| 2014/0003678 A1* | 1/2014 | Vieta | G06K 9/00026 382/124 |
| 2015/0269409 A1* | 9/2015 | Weber | G06F 3/044 382/125 |
| 2017/0083741 A1* | 3/2017 | Gao | G06K 9/00013 |

* cited by examiner

| $B_{T2}$-1 | $B_{T2}$-2 | $B_{T2}$-3 | $B_{T2}$-4 | $B_{T2}$-5 | $B_{T2}$-6 |
|---|---|---|---|---|---|
| moving up | moving up | moving up | neither moving left nor moving right | moving down | neither moving up nor moving down |
| $B_{T2}$-7 | $B_{T2}$-8 | $B_{T2}$-9 | $B_{T2}$-10 | $B_{T2}$-11 | $B_{T2}$-12 |
| neither moving up nor moving down | | | moving up | moving up | moving up |
| $B_{T2}$-13 | $B_{T2}$-14 | $B_{T2}$-15 | $B_{T2}$-16 | $B_{T2}$-17 | $B_{T2}$-18 |
| moving up | neither moving left nor moving right | moving up | moving up | moving left | moving right |

→

| moving up | neither moving up nor moving down | moving down | moving left | neither moving left nor moving right | moving right |
|---|---|---|---|---|---|
| 11 | 2 | 1 | 1 | 2 | 1 |

FIG. 4

METHOD AND ELECTRONIC DEVICE FOR DETERMINING MOVING DIRECTION OF A FINGER

CROSS REFERENCE TO RELATED APPLICATIONS

This Application claims priority of Provisional Patent Application No. 62/444,954 filed on Jan. 11, 2017, and CN Patent Application No. 201710666448.0 filed on Aug. 7, 2017, the entirety of which is incorporated by reference herein.

BACKGROUND OF THE INVENTION

Field of the Invention

The invention generally relates to the technology for determining the moving direction of a finger, and more particularly, to the technology for determining the moving direction of a finger according to the moving information corresponding to a plurality of blocks of the frames of the finger.

Description of the Related Art

In the conventional technology for determining the moving direction of a finger, a testing block with relatively large area is utilized to calculate Euclidean Distance, wherein the area of the testing block is a little bit smaller than the original image. Specifically, in conventional technology for determining the moving direction of a finger, a testing block is first obtained from a prior original image. Then, the testing block is then moved within a later new original image along different directions (up, down, left and right), and the similarities corresponding to the different directions are calculated by comparing the testing block with different portions of the later new original image. The direction with the highest similarity will be determined to be the moving direction of the finger. The scheme for determining similarity involves calculating the Euclidean Distance between two images, i.e. the testing block and the later new original image. The shorter Euclidean Distance is, the higher similarity. Therefore, in conventional technology for determining the moving direction of a finger, the calculation (e.g. of Euclidean Distance) for calculating similarity between images with relatively large areas needs to be performed a lot of times in order to know the moving direction of the finger. Therefore, a large amount of calculation is required.

BRIEF SUMMARY OF THE INVENTION

A method and electronic device for determining the moving direction of a finger according to the moving information corresponding to a plurality of blocks of the frames of the finger are provided.

An embodiment of the invention provides a method for determining the moving direction of a finger. The method for determining the moving direction of a finger comprises the steps of sensing a fingerprint of the finger at a first sampling time point to generate a first frame, wherein the first frame comprises a plurality of first blocks; sensing the fingerprint of the finger at a second sampling time point to generate a second frame, wherein the second frame comprises a plurality of second blocks and each of the second blocks corresponds to one of the first blocks, respectively; comparing each of the first blocks with its corresponding second block to obtain moving information corresponding to such second block; and determining the moving direction of the finger according to all of the moving information corresponding to the second blocks.

An embodiment of the invention provides an electronic device. The electronic device comprises a sensing device and a processor. The sensing device senses a fingerprint of a finger at a first sampling time point to generate a first frame, and senses the fingerprint of the finger at a second sampling time point to generate a second frame, wherein the first frame comprises a plurality of first blocks and the second frame comprises a plurality of second blocks, and wherein each of the second blocks corresponds to one of the first blocks, respectively. The processor is coupled to the sensing device, compares each of the first blocks with its corresponding second block to obtain moving information corresponding to such second block, and determines the moving direction of the finger according to all of the moving information corresponding to the second blocks.

Other aspects and features of the invention will become apparent to those with ordinary skill in the art upon review of the following descriptions of specific embodiments of methods and devices.

BRIEF DESCRIPTION OF THE DRAWINGS

The invention will become more fully understood by referring to the following detailed description with reference to the accompanying drawings, wherein:

FIG. 4 is a schematic diagram illustrating a method for determining the moving direction of a finger according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
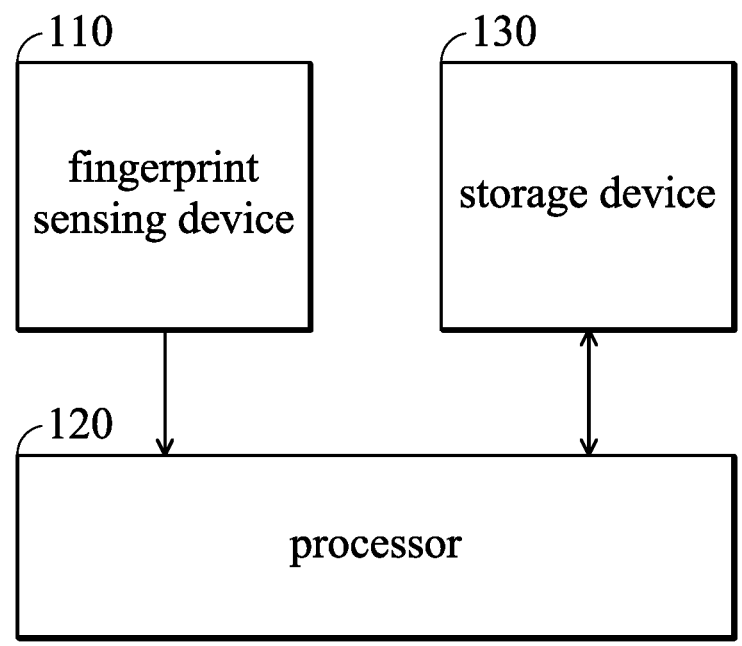
FIG. 1 is a block diagram of an electronic device 100 according to an embodiment of the invention.

FIG. 1 is a block diagram of an electronic device 100 according to an embodiment of the invention. In an embodiment of the invention, the electronic device 100 is an electronic device with fingerprint recognition function, e.g. a mobile phone, a smartphone, a tablet computer, a note book, and so on. As shown in FIG. 1, the electronic device 100 comprises a fingerprint sensing device 110, a processing unit 120 and a storage device 130. FIG. 1 presents a simplified block diagram in which only the elements relevant to the invention are shown. However, the invention should not be limited to what is shown in FIG. 1.

In the embodiments of the invention, the fingerprint sensing device 110 may comprise a sensing chip which comprises a sensing array, but the invention should not be limited thereto. The sensing array comprises a plurality of sensing units arranged in two dimensions, and each of the sensing units corresponds to a pixel. In an embodiment of the invention, the storage device 130 may store the data generated by the fingerprint sensing device 110.

According to embodiments of the invention, the fingerprint sensing device 110 may sense the finger which the user has placed on the fingerprint sensing device 110 at sampling time points Tx according to a sampling frequency to generate frames $F_{Tx}$. In the embodiments of the invention, the frames $F_{Tx}$ generated by the fingerprint sensing device 110 at each of the sampling time points Tx may be a gray level image. For example, the fingerprint sensing device 110 may sense the finger which the user has placed on the fingerprint sensing device 110 at a first sampling time point T1 to generate a first frame $F_{T1}$ corresponding to the finger, and the fingerprint sensing device 110 may then sense the finger at a second sampling time point T2 to generate a second frame $F_{T2}$.

According to the embodiments of the invention, the frame $F_{Tx}$ comprises a plurality of blocks $B_{Tx}$, and the total area of the plurality of blocks $B_{Tx}$ is smaller than the area of the frame $F_{Tx}$. For example, the first frame $F_{T1}$ may comprise a plurality of first blocks $B_{T1}$ and the second frame $F_{T2}$ may comprises a plurality of second blocks $B_{T2}$. The processor 120 may compare the plurality of first blocks $B_{T1}$ with the plurality of second blocks $B_{T2}$, respectively and correspondingly.

Figure 2A:
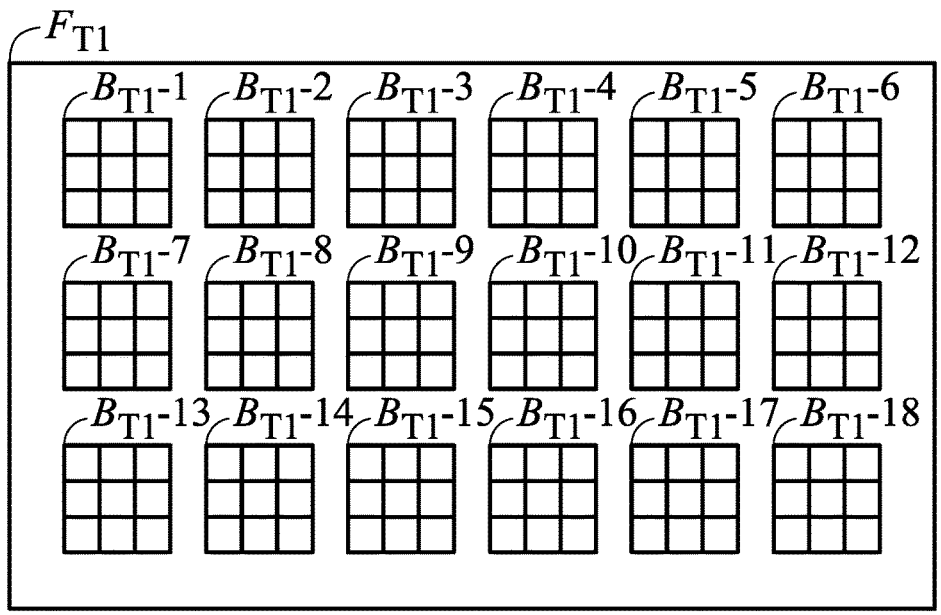
FIGS. 2A and 2B are a schematic diagram illustrating the first frame $F_{T1}$ and the second frame $F_{T2}$ according to an embodiment of the invention.
Figure 2B:
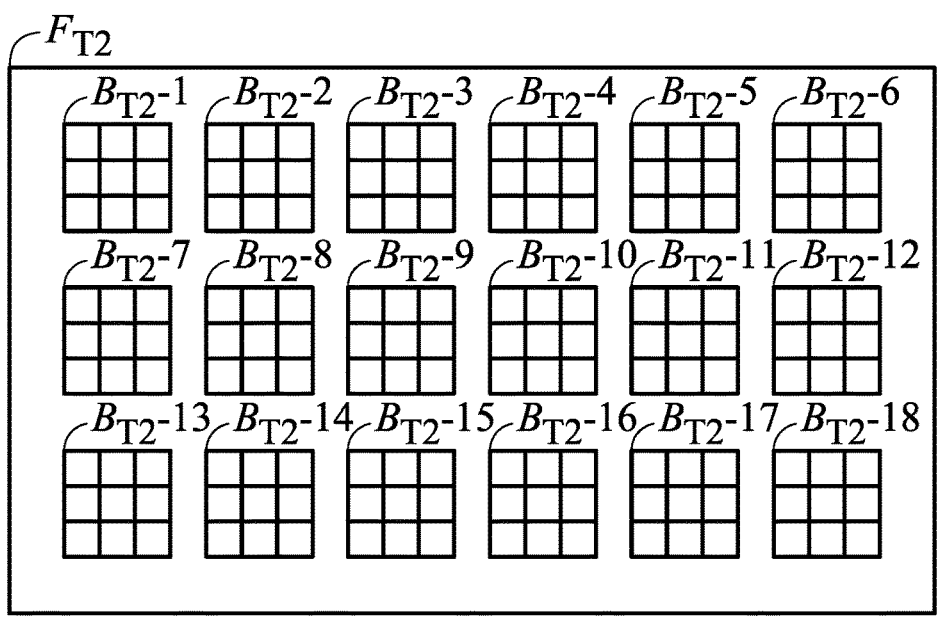

FIGS. 2A and 2B are referenced in the example below. According to the embodiments of the invention, the processor 120 may compare the plurality of first blocks $B_{T1}$ with the plurality of second blocks $B_{T2}$, respectively and correspondingly.

In addition, according to the embodiments of the invention, each block $B_{Tx}$ comprises a plurality of sub-blocks Sub-$B_{Tx}$. Each sub-block Sub-$B_{Tx}$ can be regarded as a pixel, and the block $B_{Tx}$ may be a N×N pixel matrix or a N×M pixel matrix, wherein N≠M and N and M are integers that are equal to or greater than 3. For example, each of the first blocks $B_{T1}$ may comprise a plurality of first sub-blocks Sub-$B_{T1}$ and each of the second blocks $B_{T2}$ may comprise a plurality of second sub-blocks Sub-$B_{T2}$. For example, each of the first blocks $B_{T1}$ and each of the second blocks $B_{T2}$ may comprise 3×3 first sub-blocks Sub-$B_{T1}$ and 3×3 second sub-blocks Sub-$B_{T2}$, respectively.

FIGS. 2A and 2B are schematic diagrams illustrating the first frame $F_{T1}$ and the second frame $F_{T2}$ according to an embodiment of the invention. As shown in FIG. 2A, the first frame $F_{T1}$ comprises a plurality of first blocks $B_{T1}$-1~$B_{T1}$-18, and each of the first blocks $B_{T1}$-1~$B_{T1}$-18 comprises 3×3 first sub-blocks Sub-$B_{T1}$. As shown in FIG. 2B, the second frame $F_{T2}$ comprises a plurality of second blocks $B_{T2}$-1~$B_{T2}$-18, and each of the second blocks $B_{T2}$-1~$B_{T2}$-18 comprises 3×3 second sub-blocks Sub-$B_{T2}$. The locations of the first blocks $B_{T1}$-1~$B_{T1}$-18 respectively correspond to the locations of the second blocks $B_{T2}$-1~$B_{T2}$-18. When the first frame $F_{T1}$ is compared with the second frame $F_{T2}$, the processor 120 may compare the first block $B_{T1}$-1 with the second block $B_{T2}$-1. Accordingly, the processor 120 may compare all of the first blocks with all of the second blocks, e.g. the processor 120 may compare the first block $B_{T1}$-2 with the second block $B_{T2}$-2. It should be noted that the schematic diagrams of FIGS. 2A and 2B are only utilized to illustrate the embodiments of the invention. However, the invention should not be limited thereto. In other embodiments of the invention, each of the frames may comprise a different number of blocks, and the blocks of each of the frames may be distributed or arranged in different ways. Furthermore, in other embodiments of the invention, each of the blocks included in each of the frames may comprise a different number of sub-blocks.

According to the embodiments of the invention, when the processor 120 compares a first block $B_{T1}$ with a second block $B_{T2}$, the processor 120 may compare the first sub-blocks in the middle row of the first block $B_{T1}$ with the second sub-blocks in each of the rows of the second block $B_{T2}$, and the processor 120 may compare the first sub-blocks in the middle column of the first block $B_{T1}$ with the second sub-blocks in each of the columns of the second block $B_{T2}$.

According to an embodiment of the invention, if a first block $B_{T1}$ is a N×N pixel matrix and N is an odd number, the middle row is the $$\left(\frac{N-1}{2}+1\right)-th$$

row of the last block $B_{T1}$ and the middle column is the $$\left(\frac{N-1}{2}+1\right)-th$$

column of the first block $B_{T1}$. According to another embodiment of the invention, if a first block $B_{T1}$ is a N×N pixel matrix and N is an even number, the middle row is the $$\left(\left\lfloor\frac{N-1}{2}+1\right\rfloor\right)-th$$

row or the $$\left(\left\lfloor\frac{N-1}{2}+1\right\rfloor+1\right)-th$$

row of the first block $B_{T1}$ and the middle column is the $$\left(\left\lfloor\frac{N-1}{2}+1\right\rfloor\right)-th$$

column or the $$\left(\left\lfloor\frac{N-1}{2}+1\right\rfloor+1\right)-th$$

column of the first block $B_{T1}$. For example, if each of the first blocks $B_{T1}$ comprises 3×3 first sub-blocks, the middle row is the second row and the middle column is the second column. If each of the first blocks $B_{T1}$ comprises 4×4 first sub-blocks, the middle row is the second row or the third row and the middle column is the second column or the third column.

According to another embodiment of the invention, if a first block $B_{T1}$ is a N×M pixel matrix (N≠M) and N is an even number and M is an odd number, the middle row is the row or the $$\left(\left\lfloor\frac{N-1}{2}+1\right\rfloor+1\right)-th$$

row of the first block $B_{T1}$ and the middle column is the $$\left(\frac{N-1}{2}+1\right)-th$$

column of the first block $B_{T1}$. For example, if each of the first blocks $B_{T1}$ comprises 4×3 first sub-blocks, the middle row is the second row or the third row and the middle column is the second column.

Figure 3A:
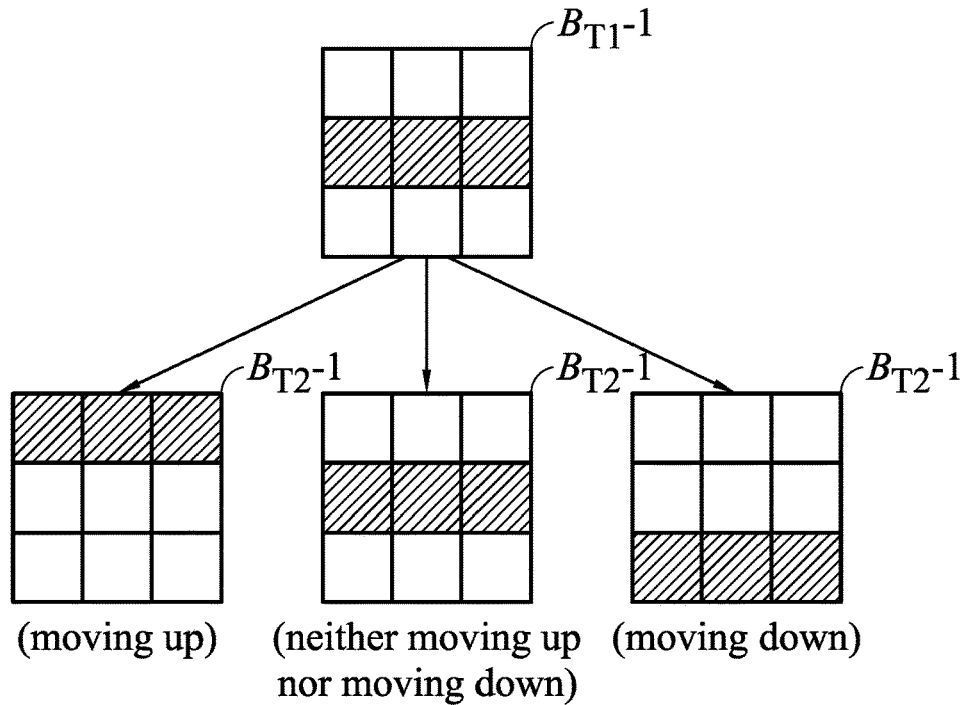
FIGS. 3A and 3B are a schematic diagram illustrating an example for comparing a plurality of first sub-blocks and a plurality of second sub-blocks according to an embodiment of the invention.
Figure 3B:
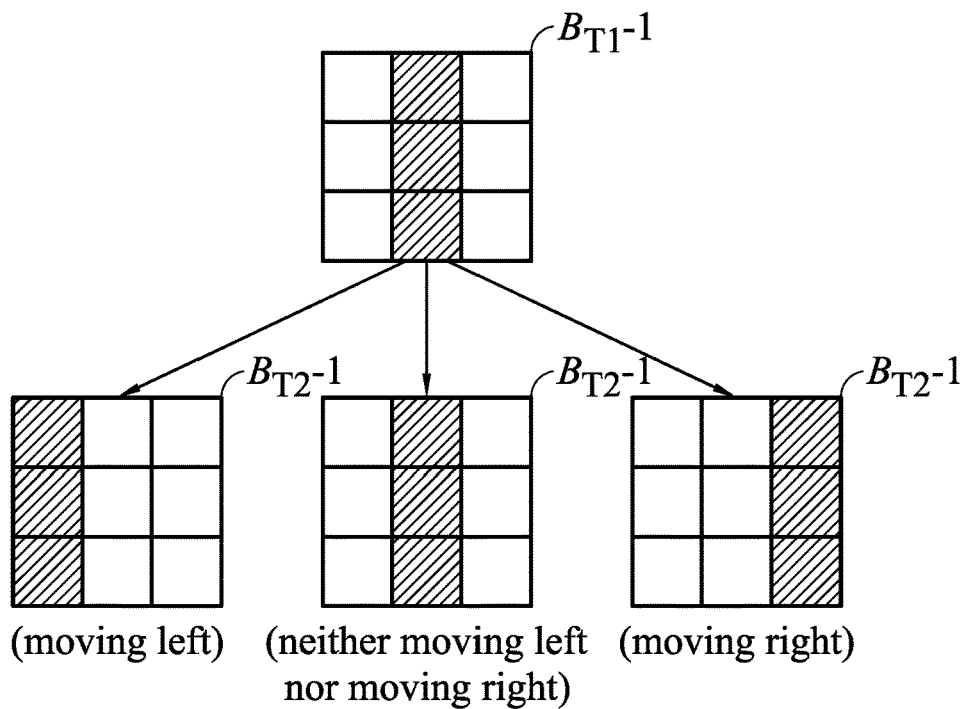

According to an embodiment of the invention, if a first block $B_{T1}$ is a N×N pixel matrix and N is an odd number, the processor 120 may compare the first sub-blocks in the $$\left(\frac{N-1}{2}+1\right)-th$$

row of the first block $B_{T1}$ with the second sub-blocks in the $$\left(\frac{N-1}{2}\right)-th$$

row of the second block $B_{T2}$ to generate a comparison result $S_{up1}$, compare the first sub-blocks in the $$\left(\frac{N-1}{2}+1\right)-th$$

row of the first block $B_{T1}$ with the second sub-blocks in the $$\left(\frac{N-1}{2}+1\right)-th$$

row of the second block $B_{T2}$ to generate a comparison result $S_{row}$, and compare the first sub-blocks in the $$\left(\frac{N-1}{2}+1\right)-th$$

row of the first block $B_{T1}$ with the second sub-blocks in the $$\left(\frac{N-1}{2}+2\right)-th$$

row of the second block $B_{T2}$ to generate a comparison result $S_{down1}$. In addition, the processor 120 may compare the first sub-blocks in the $$\left(\frac{N-1}{2}+1\right)-th$$

column of the first block $B_{T1}$ with the second sub-blocks in the $$\left(\frac{N-1}{2}\right)-th$$

column of the second block $B_{T2}$ to generate a comparison result $S_{left1}$, compare the first sub-blocks in the $$\left(\frac{N-1}{2}+1\right)-th$$

column of the first block $B_{T1}$ with the second sub-blocks in the $$\left(\frac{N-1}{2}+1\right)-th$$

column of the second block $B_{T2}$ to generate a comparison result $S_{column}$, and compare the first sub-blocks in the $$\left(\frac{N-1}{2}+1\right)-th$$

column of the first block $B_{T1}$ with the second sub-blocks in the $$\left(\frac{N-1}{2}+2\right)-th$$

column of the second block $B_{T2}$ to generate a comparison result $S_{right1}$. FIGS. 3A and 3B are used for illustration below. In the embodiment of the invention, in order to control the sensed shift is about one pixel, the sampling frequency applied by the fingerprint sensing device 110 needs to make the sensed shift between the first frame $F_{T1}$ obtained at the first sampling time point T1 and the second frame $F_{T2}$ obtained at the second sampling time point T2 is about one pixel.

FIGS. 3A and 3B are schematic diagrams illustrating an example for comparing a plurality of first sub-blocks and a plurality of second sub-blocks according to an embodiment of the invention. Taking the first block $B_{T1}$-1 and the second block $B_{T2}$-1 of FIGS. 2A and 2B for example, the first block $B_{T1}$-1 and the second block $B_{T2}$-1 respectively comprise 3×3 first sub-blocks and 3×3 second sub-blocks. When the first block $B_{T1}$-1 is compared with the second block $B_{T2}$-1, the processor 120 may take the second row of the first block $B_{T1}$-1 as the middle row and take the second column of the first block $B_{T1}$-1 as the middle column. As shown in FIG. 3A, the processor 120 may compare the first sub-blocks in the second row of the first block $B_{T1}$-1 with the second sub-blocks in the first, second and third row of the second block $B_{T2}$-1 to respectively generate the comparison results $S_{up1}$, $S_{row}$ and $S_{down1}$. Furthermore, as shown in FIG. 3B, the processor 120 may compare the first sub-blocks in the second column of the first block $B_{T1}$-1 with the second sub-blocks in the first, second and third column of the second block $B_{T2}$-1 to respectively generate the comparison results $S_{left1}$, $S_{column}$ and $S_{right1}$. In the embodiment of the invention, the comparison result $S_{up1}$ is utilized to represent that the second row of the first block $B_{T1}$-1 moves up one pixel. The comparison result $S_{row}$ is utilized to represent that the second row of the first block $B_{T1}$-1 neither moves up nor moves down. The comparison result $S_{down1}$ is utilized to represent that the second row of the first block $B_{T1}$-1 moves down one pixel. The comparison result $S_{left1}$ is utilized to represent that the second column of the first block $B_{T1}$-1 moves left one pixel. The comparison result $S_{column}$ is utilized to represent that the second column of the first block $B_{T1}$-1 neither moves left nor moves right. The comparison result $S_{right1}$ is utilized to represent that the second column of the first block $B_{T1}$-1 moves right one pixel.

According to FIGS. 3A and 3B, when the processor 120 compares a first block $B_{T1}$ (e.g. $B_{T1}$-1) with its corresponding second block $B_{T2}$ (e.g. $B_{T2}$-1), the processor 120 may calculate similarity between the first sub-blocks of the second row of the first block $B_{T1}$ and the second sub-blocks of the first row of the second block $B_{T2}$ to generate a comparison result $S_{up1}$, calculate similarity between the first sub-blocks of the second row of the first block $B_{T1}$ and the second sub-blocks of the second row of the second block $B_{T2}$ to generate a comparison result $S_{row}$, calculate similarity between the first sub-blocks of the second row of the first block $B_{T1}$ and the second sub-blocks of the third row of the second block $B_{T2}$ to generate a comparison result $S_{down1}$, calculate similarity between the first sub-blocks of the second column of the first block $B_{T1}$ and the second sub-blocks of the first column of the second block $B_{T2}$ to generate a comparison result $S_{left1}$, calculate similarity between the first sub-blocks of the second column of the first block $B_{T1}$ and the second sub-blocks of the second column of the second block $B_{T2}$ to generate a comparison result $S_{column}$, and calculate similarity between the first sub-blocks of the second column of the first block $B_{T1}$ and the second sub-blocks of the third column of the second block $B_{T2}$ to generate a comparison result $S_{right1}$.

After the processor 120 calculates the comparison results $S_{up1}$, $S_{row}$, $S_{down1}$, $S_{left1}$, $S_{column}$ and $S_{right1}$, the processor 120 may, according to the comparison results $S_{up1}$, $S_{row}$, $S_{down1}$, $S_{left1}$, $S_{column}$ and $S_{right1}$, select the direction that corresponds to the comparison result with the highest degree of similarity to be the moving direction corresponding to the second block $B_{T2}$, i.e. the moving information of the second block $B_{T2}$. If the comparison result $S_{up1}$ is the highest, the processor 120 may determine that the moving information of the second block $B_{T2}$ represents the moving direction of moving up. If the comparison result $S_{row}$ is the highest, the processor 120 may determine that the moving information of the second block $B_{T2}$ represents the moving direction of neither moving up nor moving down. If the comparison result $S_{down1}$ is the highest, the processor 120 may determine that the moving information of the second block $B_{T2}$ represents the moving direction of moving down. If the comparison result $S_{left1}$ is the highest, the processor 120 may determine that the moving information of the second block $B_{T2}$ represents the moving direction of moving left. If the comparison result $S_{column}$ is the highest, the processor 120 may determine that the moving information of the second block $B_{T2}$ represents the moving direction of neither moving left nor moving right. If the comparison result $S_{right1}$ is the highest, the processor 120 may determine that the moving information of the second block $B_{T2}$ represents the moving direction of moving right. Taking FIGS. 3A and 3B for example, if the comparison result $S_{up1}$ is the highest, the processor 120 may determine that the moving information of the second block $B_{T2}$-1 represents the moving direction of moving up one pixel. If the comparison result $S_{left1}$ is the highest, the processor 120 may determine that the moving information of the second block $B_{T2}$-1 represents the moving direction of moving left one pixel. Accordingly, the processor 120 may obtain the moving information corresponding to each of the second blocks $B_{T2}$.

According to an embodiment of the invention, the processor 120 calculates the similarity according to the Euclidean Distance, but the invention should not be limited thereto. The processor 120 may calculate the Euclidean Distance according to the gray level values of the sub-blocks. Taking FIGS. 3A and 3B for example, the processor 120 may calculate similarity (i.e. the first Euclidean Distance) between the middle row (i.e. the second row) of the first block $B_{T1}$-1 and the first row of the second block $B_{T2}$-1 to generate the comparison result $S_{up1}$. Accordingly, the processor 120 may calculate other comparison results $S_{row}$, $S_{down1}$, $S_{left1}$, $S_{column}$ and $S_{right1}$.

In the embodiments of the invention, when the processor 120 obtains the moving information corresponding to all of the second blocks $B_{T2}$, the processor 120 may determine which direction corresponds to the maximum number of times according to all of the moving information (e.g. moving up, neither moving up nor moving down, moving down, moving left, neither moving left nor moving right, or moving right) corresponding to all of the second blocks $B_{T2}$. Then, the processor 120 may take the direction corresponding to the maximum number of times to be the moving direction of the finger. That is to say, the processor 120 may determine the moving direction of the finger through a majority rule.

FIG. 4 is a schematic diagram illustrating a method for determining the moving direction of the finger according to an embodiment of the invention. As shown in FIG. 4, when the processor 120 obtains the moving information corresponding each of the second blocks $B_{T2}$-1~$B_{T2}$-18 of the second frame $F_{T2}$, the processor 120 may count the number of times the moving information corresponding to each of the different directions appears (e.g. moving up, neither moving up nor moving down, moving down, moving left, neither moving left nor moving right, or moving right) according to all of the moving information corresponding to the second blocks $B_{T2}$-1~$B_{T2}$-18. As shown in FIG. 4, because the moving information corresponding to the direction of moving up appears the highest number of times, the processor 120 may determine that the finger is moving up.

Figure 5:
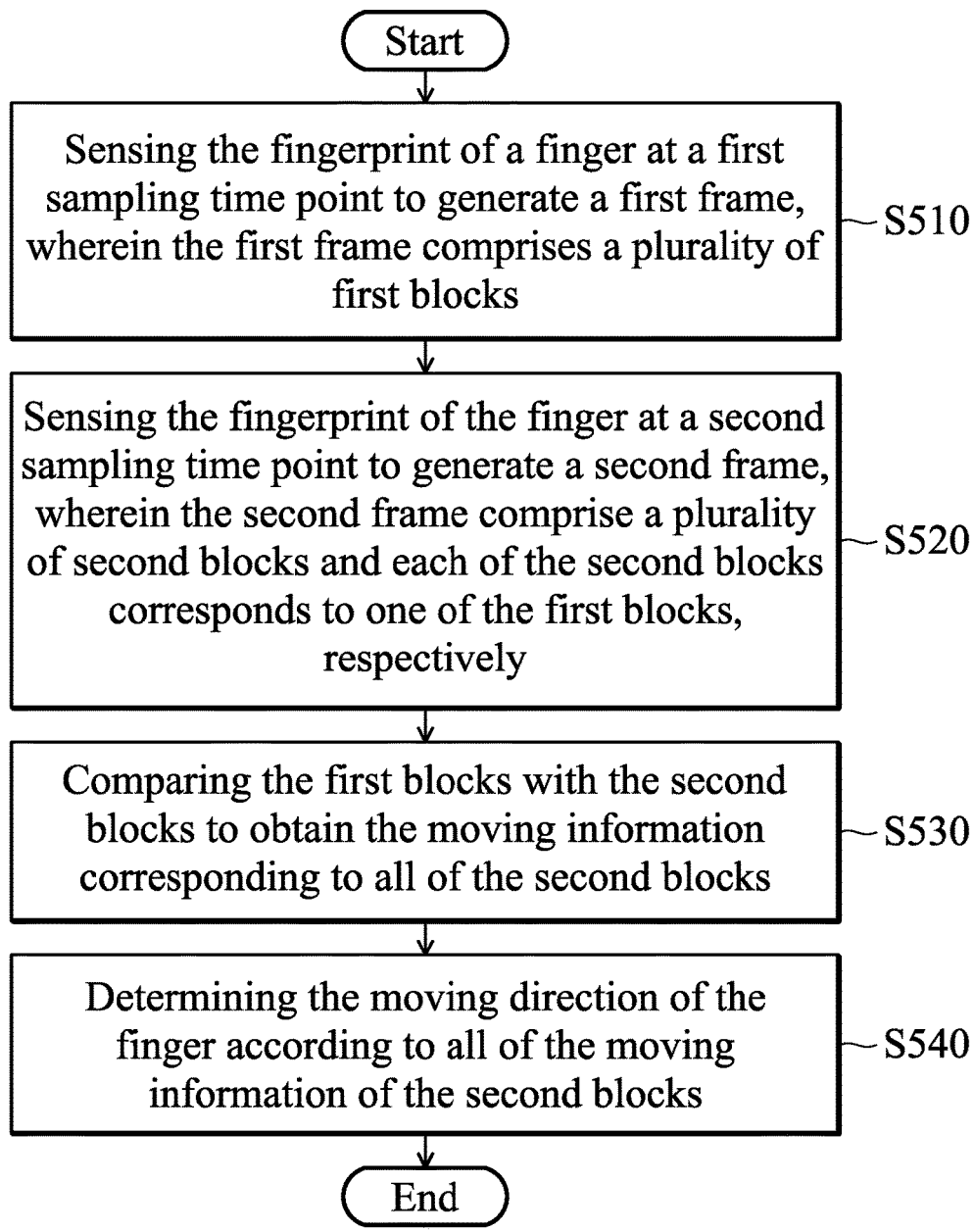
FIG. 5 is a flow chart 500 illustrating a method for determining the moving direction of a finger according to an embodiment of the invention.

FIG. 5 is a flow chart 500 illustrating a method for determining the moving direction of a finger according to an embodiment of the invention. The method for determining the moving direction of the finger is applied to an electronic device 100. As shown in FIG. 5, first, in step S510, the electronic device 100 senses the fingerprint of a finger at a first sampling time point to generate a first frame. The first frame comprises a plurality of first blocks. In step S520, the electronic device 100 senses the fingerprint of the finger at a second sampling time point to generate a second frame. The second frame comprises a plurality of second blocks and each of the second blocks corresponds to one of the first blocks, respectively.

In step S530, the electronic device 100 compares the first blocks with the second blocks to obtain the moving information corresponding to all of the second blocks. In step S540, the electronic device 100 determines the moving direction of the finger according to all of the moving information of the second blocks.

In the embodiment of the invention, each of the first blocks comprises a plurality of first sub-blocks and each of the second blocks comprises a plurality of second sub-blocks.

In an embodiment of the invention, in step S530, the electronic device 100 further compares the first blocks with the second blocks according to the first sub-blocks in the middle rows of the first blocks and the first sub-blocks in the middle columns of the first blocks to obtain the moving information corresponding to all of the second blocks.

In the methods for determining the moving direction of the finger according to the embodiments of the invention, the electronic device 100 can obtain the moving information corresponding to each block by comparing the sub-blocks corresponding to different directions. Therefore, the methods for determining the moving direction of the finger according to the embodiments of the invention can decrease the amount of calculation needed for determining the moving direction of the finger and accelerate the speed of determining the moving direction of the finger. Furthermore, according to the methods for determining the moving direction of the finger of the embodiments of the invention, even when the frame comprises only partial fingerprint information, the electronic device can still determine the moving direction of the finger.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearance of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for determining a moving direction of a finger, comprising:
   sensing a fingerprint of the finger at a first sampling time point to generate a first frame, wherein the first frame comprises a plurality of first blocks;
   sensing the fingerprint of the finger at a second sampling time point to generate a second frame, wherein the second frame comprises a plurality of second blocks and each of the second blocks corresponds to one of the first blocks, respectively, and each of the first blocks and its corresponding second block have the same location;
   comparing each of the first blocks with its corresponding second block to obtain moving information corresponding to such second block; and
   determining the moving direction of the finger according to all of the moving information corresponding to the second blocks.

2. The method of claim 1, further comprising:
   comparing each of the first blocks with its corresponding second block according to a middle row of such first block and a middle column of such first block to obtain the moving information corresponding to each of the second blocks.

3. The method of claim 1, wherein each of the first blocks comprises N×N first sub-blocks and each of the second blocks comprises N×N second sub-blocks, and wherein N is an integer and an odd number.

4. The method of claim 3, wherein the comparison step further comprises:
   comparing the first sub-blocks in a $$\left(\frac{N-1}{2}+1\right)-th$$

row or each or me first blocks with the second sub-blocks in a $$\left(\frac{N-1}{2}\right)-th$$

row of the corresponding second block to generate a comparison result $S_{up1}$;
   comparing the first sub-blocks in the $$\left(\frac{N-1}{2}+1\right)-th$$

row or each or me first blocks with the second sub-blocks in a row of the corresponding second block to generate a comparison result $S_{row}$;

comparing the first sub-blocks in the $$\left(\frac{N-1}{2}+1\right)-th$$

row of each of the first blocks with the second sub-blocks in a $$\left(\frac{N-1}{2}+2\right)-th$$

row of the corresponding second block to generate a comparison result $S_{down1}$;

comparing the first sub-blocks in a $$\left(\frac{N-1}{2}+1\right)-th$$

column or each or me first blocks with the second sub-blocks in a $$\left(\frac{N-1}{2}\right)-th$$

column of the corresponding second block to generate a comparison result $S_{left1}$;

comparing the first sub-blocks in the $$\left(\frac{N-1}{2}+1\right)-th$$

column of each of the first blocks with the second sub-blocks in a $$\left(\frac{N-1}{2}+1\right)-th$$

column of the corresponding second block to generate a comparison result $S_{column}$;

comparing the first sub-blocks in the $$\left(\frac{N-1}{2}+1\right)-th$$

column of each of the first blocks with the second sub-blocks in a $$\left(\frac{N-1}{2}+2\right)-th$$

column of the corresponding second block to generate a comparison result $S_{right1}$; and obtaining the moving information corresponding to each of the second blocks according to the comparison result $S_{up1}$, the comparison result $S_{row}$, the comparison result $S_{down1}$, the comparison result $S_{left1}$, the comparison result $S_{column}$ and the comparison result $S_{right1}$.

5. The method of claim 4, further comprising:
calculating a similarity according to Euclidean Distance to generate the comparison result $S_{up1}$, the comparison result $S_{row}$, the comparison result $S_{down1}$, the comparison result $S_{left1}$, the comparison result $S_{column}$ and the comparison result $S_{right1}$; and
selecting the comparison result with the highest similarity to be the moving information corresponding to the second block.

6. The method of claim 5, wherein the comparison step further comprises:
determining the moving direction of the finger to be the moving direction represented a maximum number of times according to all of the moving information of the second blocks, wherein the comparison result $S_{up1}$ represents the moving direction of moving up, the comparison result $S_{row}$ represents the moving direction of neither moving up nor moving down, the comparison result $S_{down1}$ represents the moving direction of moving down, the comparison result $S_{left1}$ represents the moving direction of moving left, the comparison result $S_{column}$ represents the moving direction of neither moving left nor moving right, and the comparison result $S_{right1}$ represents the moving direction of moving right.

7. The method of claim 1, wherein each of the first blocks comprises N×N first sub-blocks and each of the second blocks comprises N×N second sub-blocks, and wherein N is an integer and an even number.

8. The method of claim 1, wherein each of the first blocks comprises N×M first sub-blocks and each of the second blocks comprises N×M second sub-blocks, and wherein N and M are integers and N is an even number and M is an odd number.

9. An electronic device, comprising:
a sensing device, sensing a fingerprint of a finger at a first sampling time point to generate a first frame, and sensing the fingerprint of the finger at a second sampling time point to generate a second frame, wherein the first frame comprises a plurality of first blocks and the second frame comprises a plurality of second blocks, and wherein each of the second blocks corresponds to one of the first blocks, respectively, and each of the first blocks and its corresponding second block have the same location; and
a processor, coupled to the sensing device, comparing each of the first blocks with its corresponding second block to obtain moving information corresponding to such second block, and determining the moving direction of the finger according to all of the moving information corresponding to the second blocks.

10. The electronic device of claim 9, wherein the processor compares each of the first blocks with its corresponding second block according to a middle row of such first block and a middle column of such first block to obtain the moving information corresponding to each of the second blocks.

11. The electronic device of claim 9, wherein each of the first blocks comprises N×N first sub-blocks and each of the second blocks comprises N×N second sub-blocks, and wherein N is an integer and an odd number.

12. The electronic device of claim 11, wherein the processor further compares the first sub-blocks in a $$\left(\frac{N-1}{2}+1\right)\text{-}th$$

row or each or me first blocks with the second sub-blocks in a $$\left(\frac{N-1}{2}\right)\text{-}th$$

row of the corresponding second block to generate a comparison result $S_{up1}$; compares the first sub-blocks in the $$\left(\frac{N-1}{2}+1\right)\text{-}th$$

row of each of the first blocks with the second sub-blocks in a $$\left(\frac{N-1}{2}+1\right)\text{-}th$$

row of the corresponding second block to generate a comparison result $S_{row}$; compares the first sub-blocks in the $$\left(\frac{N-1}{2}+1\right)\text{-}th$$

row of each of the first blocks with the second sub-blocks in a $$\left(\frac{N-1}{2}+2\right)\text{-}th$$

row of the corresponding second block to generate a comparison result $S_{down1}$; compares the first sub-blocks in a $$\left(\frac{N-1}{2}+1\right)\text{-}th$$

column of each of the first blocks with the second sub-blocks in a $$\left(\frac{N-1}{2}\right)\text{-}th$$

column of the corresponding second block to generate a comparison result $S_{left1}$; compares the first sub-blocks in the $$\left(\frac{N-1}{2}+1\right)\text{-}th$$

column of each of the first blocks with the second sub-blocks in a $$\left(\frac{N-1}{2}+1\right)\text{-}th$$

column of the corresponding second block to generate a comparison result $S_{column}$; compares the first sub-blocks in the $$\left(\frac{N-1}{2}+1\right)\text{-}th$$

column of each of the first blocks with the second sub-blocks in a $$\left(\frac{N-1}{2}+2\right)\text{-}th$$

column of the corresponding second block to generate a comparison result $S_{right1}$; and wherein the processor obtains the moving information corresponding to each of the second blocks according to the comparison result $S_{up1}$, the comparison result $S_{row}$, the comparison result $S_{down1}$, the comparison result $S_{left1}$, the comparison result $S_{column}$ and the comparison result $S_{right1}$.

13. The electronic device of claim 12, wherein the processor calculates a similarity according to Euclidean Distance to generate the comparison result $S_{up1}$, the comparison result $S_{row}$, the comparison result $S_{down1}$, the comparison result $S_{left1}$, the comparison result $S_{column}$ and the comparison result $S_{right1}$; and wherein the processor selects the comparison result with the highest similarity to be the moving information corresponding to the second block.

14. The electronic device of claim 13, wherein the processor determines the moving direction of the finger to be the moving direction represented a maximum number of times according to all of the moving information of the second blocks, wherein the comparison result $S_{up1}$ represents the moving direction of moving up, the comparison result $S_{row}$ represents the moving direction of neither moving up nor moving down, the comparison result $S_{down1}$ represents the moving direction of moving down, the comparison result $S_{left1}$ represents the moving direction of moving left, the comparison result $S_{column}$ represents the moving direction of neither moving left nor moving right, and the comparison result $S_{right1}$ represents the moving direction of moving right.

15. The electronic device of claim 1, wherein each of the first blocks comprises N×N first sub-blocks and each of the second blocks comprises N×N second sub-blocks, and wherein N is an integer and an even number.

16. The electronic device of claim 1, wherein each of the first blocks comprises N×M first sub-blocks and each of the second blocks comprises N×M second sub-blocks, and wherein N and M are integers and N is an even number and M is an odd number.

* * * * *